(12) United States Patent
Zeng

(10) Patent No.: US 12,738,837 B2
(45) Date of Patent: Sep. 15, 2026

(54) POWER CONVERSION DEVICE AND MAGNETIC ASSEMBLY

(71) Applicant: MetaPWR Electronics Co., Ltd., Shanghai (CN)

(72) Inventor: Jianhong Zeng, Shanghai (CN)

(73) Assignee: MetaPWR Electronics Co., Ltd., Shanghai (CN)

( * ) Notice: Subject to any disclaimer, the term of this patent is extended or adjusted under 35 U.S.C. 154(b) by 229 days.

(21) Appl. No.: 18/648,497

(22) Filed: Apr. 29, 2024

(65) Prior Publication Data

US 2024/0380311 A1 Nov. 14, 2024

(30) Foreign Application Priority Data

May 13, 2023 (CN) ........................ 202310540258.X

(51) Int. Cl.
*H02M 1/36* (2007.01)
*H01F 27/24* (2006.01)
(Continued)

(52) U.S. Cl.
CPC .............. *H02M 1/36* (2013.01); *H01F 27/24* (2013.01); *H01F 27/306* (2013.01); *H02M 1/0054* (2021.05); *H02M 1/32* (2013.01)

(58) Field of Classification Search
CPC .. H02M 1/0045; H02M 1/0054; H02M 1/088; H02M 1/32; H02M 1/36;
(Continued)

(56) References Cited

U.S. PATENT DOCUMENTS 6,392,902 B1 * 5/2002 Jang .................. H02M 3/33573 363/56.02
11,641,153 B2 * 5/2023 Jin ........................ H02M 5/293 323/282

(Continued)

FOREIGN PATENT DOCUMENTS

CN 204349772 U † 5/2015
CN 206542186 U † 10/2017

(Continued)

*Primary Examiner* — Crystal L Hammond
*Assistant Examiner* — Nicolas Alden Chapa Mills
(74) *Attorney, Agent, or Firm* — JCIPRNET

(57) ABSTRACT

A power conversion circuit and a magnetic assembly are provided. The magnetic assembly comprises a transformer magnetic core, an inductance magnetic core, a first winding and a second winding, and discloses a winding method of the first winding and the second winding. On the other hand, an auxiliary power supply circuit is provided. When the output voltage of the power conversion circuit does not reach the steady-state working voltage or the power conversion circuit is in a standby state, power supply is provided for the MCU and the power management bus. On the other hand, the application provides a power switch VDS voltage clamping protection circuit suitable for a power conversion circuit. The application of the small-size compact power conversion device can be realized, the loss of the power conversion device is reduced, and the conversion efficiency is improved.

11 Claims, 8 Drawing Sheets

(51) Int. Cl.

| | |
|---|---|
| ***H01F 27/30*** | (2006.01) |
| ***H02M 1/00*** | (2007.01) |
| ***H02M 1/32*** | (2007.01) |

(58) Field of Classification Search

CPC ........ H02M 3/158; H01F 27/28; H01F 27/24; H01F 27/306

See application file for complete search history.

(56) References Cited

U.S. PATENT DOCUMENTS

| | | | | |
|---|---|---|---|---|
| 11,784,560 | B2 * | 10/2023 | Jin | H02M 3/1584 363/118 |
| 12,438,436 | B2 * | 10/2025 | Jin | H02M 1/0054 |
| 2021/0359606 | A1 * | 11/2021 | Han | H02M 3/1586 |

FOREIGN PATENT DOCUMENTS

| | | | | |
|---|---|---|---|---|
| CN | 107437456 | B | † | 12/2017 |
| CN | 112910239 | A | † | 6/2021 |
| CN | 114464427 | A | † | 5/2022 |
| CN | 114783742 | A | † | 7/2022 |
| CN | 115762994 | A | † | 3/2023 |
| CN | 115765439 | A | † | 3/2023 |
| TW | I558126 | B | † | 11/2016 |

* cited by examiner
† cited by third party

POWER CONVERSION DEVICE AND MAGNETIC ASSEMBLY

CROSS-REFERENCE TO RELATED APPLICATIONS

This application claims the priority benefit of Chinese patent application 202310540258.X filed on May. 13, 2023. The entirety of the above-mentioned patent application is hereby incorporated by reference herein and made a part of this specification.

BACKGROUND

Along with the development of artificial intelligence, the power requirements of an artificial intelligence data processing chip, such as a CPU, a GPU, TPU and the like (collectively referred to as XPU) are higher and higher, so that the power of the server is greatly increased, the power supply voltage of the server system board rises from 12V to 48V, and the two-stage voltage reduction circuit architecture gradually becomes mainstream when the power supply voltage of the server system board is 48V.

The intermediate bus conversion device in the two-stage buck circuit architecture is used for realizing voltage conversion between an input bus and an output bus, and the ratio of the input voltage to the output voltage is a fixed gain ratio or an unfixed gain ratio. According to the intermediate bus conversion device with the non-fixed gain ratio, the input voltage in the range of 40-60 V of the server mainboard is stabilized at 12 V output voltage to supply the memory bank load on the server mainboard, the voltage regulator load, fan load and the like are supplied to the artificial intelligence chip. As the power consumption on the server mainboard becomes larger and larger, the power required to be provided by the 12V voltage-stabilized output intermediate bus conversion device is larger and larger, and the requirement for the power density and the conversion efficiency is higher and higher.

SUMMARY

In general, the application provides a power conversion device and a magnetic assembly, which improves the performance of the power conversion device and reduces the size, loss and conversion efficiency of the magnetic assembly, and the loss of the switching tube is reduced through control and driving strategies.

A power conversion device, comprising a power conversion circuit, a group of control signals and a group of drivers;

wherein the power conversion circuit comprises at least two switch bridge arms, each switch bridge arm comprises an upper switch, a middle switch and a lower switch, and the at least two switch bridge arms comprise a first switch bridge arm and a second switch bridge arm;

wherein the control signal comprises a first control signal, a second control signal, a third control signal and a fourth control signal, the first control signal and the second control signal are staggered by 180 degrees, the third control signal is complementary to the second control signal, and the fourth control signal is complementary to the first control signal; wherein the first control signal is used for controlling on and off of an upper switch of a first switch bridge arm, the second control signal is used for controlling on and off of an upper switch of a second switch bridge arm, the third control signal is used for controlling on and off of a lower switch of a second switch bridge arm, and the fourth control signal is used for controlling on and off of a lower switch of the first switch bridge arm;

wherein the AND operation result signal of the first control signal and the fourth control signal are used for controlling the on and off of the middle switch of the second switch bridge arm, and the AND operation result signal of the second control signal and the third control signal is used for controlling the on and off of the middle switch of the first switch bridge arm.

Preferably, wherein a lower switch of each of the switch bridge arms comprises two switches electrically connected in parallel, the third control signal provides drive signals for two lower switches of the second switch bridge arm via two drivers respectively, and the fourth control signal provides drive signals for the two lower switches of the first switch bridge arm respectively via the two drivers.

Preferably, wherein a middle switch of each of the switch bridge arms comprises two switches electrically connected in parallel, two switches of the first switch bridge arm are controlled by a control signal via a driver, and two switches of the second switch bridge arm are controlled by another control signal via a driver.

A power conversion device, comprising a power conversion circuit, an auxiliary power supply circuit and a power management bus;

wherein the power conversion circuit comprises an input positive terminal, an output positive terminal and a grounding end;

wherein the auxiliary power supply circuit comprises a linear voltage stabilizing circuit, an LDO voltage stabilizing circuit and a diode;

wherein the linear voltage stabilizing circuit comprises a linear input end, a linear output end and a grounding end; the LDO voltage stabilizing circuit comprises an LDO input end, an LDO output end and a grounding end; the linear input end is electrically connected with the input positive terminal of the power conversion circuit, the linear output end is electrically connected with the LDO input end, and the LDO output end is electrically connected with the power supply management bus;

wherein the positive electrode of the diode is electrically connected to an output positive terminal of the power conversion circuit, and a negative electrode of the diode is electrically connected to an LDO input end.

Preferably, wherein the grounding end of the linear voltage stabilizing circuit and a grounding end of the LDO voltage stabilizing circuit are both electrically connected to a grounding end of the power conversion circuit.

Preferably, wherein the linear voltage stabilizing circuit comprises a regulated diode, a linear switch, a resistor, a diode and a capacitor, the resistor and the regulated diode are electrically connected between the linear input end and the grounding end of the linear voltage stabilizing circuit in series, the negative electrode of the regulated diode is electrically connected with the resistor, the positive electrode of the regulated diode is electrically connected with the grounding end of the linear voltage stabilizing circuit, the gate electrode of the linear switch is electrically connected with the negative electrode of the regulated diode, the drain electrode of the linear switch is electrically connected with the linear input end, the source electrode of the linear switch is electrically connected with the positive electrode of the diode, the negative electrode of the diode is electrically connected with an LDO input end, and the capacitor is bridged between the linear output end and the grounding end of the linear voltage stabilizing circuit.

Preferably, wherein the power conversion circuit comprises at least two switch bridge arms, each of the switch bridge arms comprises an upper switch, a middle switch and a lower switch, and the at least two switch bridge arms comprise a first switch bridge arm and a second switch bridge arm.

A power conversion device comprises a power conversion circuit and a clamping circuit; wherein the power conversion circuit comprises an input positive terminal, an input negative terminal, an output positive terminal, a grounding end and at least two switch bridge arms, each switch bridge arm is bridged between the input positive terminal and the input negative terminal, each switch bridge arm comprises an upper switch, a middle switch and a lower switch, the upper switch and the middle switch are electrically connected to the upper node of the corresponding switch bridge arm, the upper switch is electrically connected to the input positive terminal, and the lower switch is electrically connected to the grounding end;

wherein the clamping circuit comprises a clamping diode, a positive electrode of the clamping diode is electrically connected to the input negative terminal, and a negative electrode of the clamping diode is electrically connected with a lower node of the switching bridge arm.

Preferably, wherein the power conversion device further comprises at least one input capacitor, and the input capacitor is bridged between the input positive terminal and the grounding end and is arranged adjacent to the upper switch and the clamping diode.

Preferably, wherein the power conversion device further comprises an active clamping circuit, the active clamping circuit is bridged between a lower node and a grounding end of one switch bridge arm, the active clamp circuit comprises an absorption capacitor, a clamp diode, a discharge switch and two discharge resistors. The positive electrode of the clamp diode is electrically connected with the lower switch, the negative electrode of the clamp diode is electrically connected with one end of the absorption capacitor, the other end of the absorption capacitor is electrically connected with a grounding end; the source electrode of the discharge switch is electrically connected to the lower node through the discharge resistor, the drain electrode of the discharge switch is electrically connected to the negative electrode of the clamp diode through the discharge resistor, the gate electrode of the discharge switch is electrically connected to the gate electrode of the middle switch through the differential capacitor, the positive electrode of A zenar diode is electrically connected with the lower switch, and the negative electrode of the zenar diode is electrically connected with the gate electrode of the discharge switch.

A magnetic assembly, comprising a first winding, a second winding, a transformer magnetic core and an inductance magnetic core;

wherein the transformer magnetic core comprises two transformer magnetic substrates, two transformer side columns and a transformer middle column, wherein the two transformer side columns and one transformer middle column are arranged between the two transformer magnetic substrates;

wherein the inductance magnetic core comprises two inductance magnetic substrates, two inductance side columns and an inductance middle column, wherein the two inductance magnetic substrates, the two inductance side columns and one inductance middle column are arranged between the two inductance magnetic substrates;

wherein the first winding is wound around the middle column of the transformer in the first direction to form at least one round, and at least one round is wound around the middle column of the inductor in the second direction. At least one round of the second winding is wound around the middle column of the transformer and the middle column of the inductor in the first direction.

Preferably, wherein the first end of the first winding and the first end of the second winding are arranged on the first side of the magnetic assembly, and the second end of the first winding and the second end of the second winding are arranged on the second side of the magnetic assembly.

Preferably, wherein the transformer middle column is arranged between the two transformer side columns, and a channel between each transformer side column and the transformer middle column is a transformer winding channel; the transformer magnetic core further comprises a first transformer winding channel side and a second transformer winding channel side which are opposite to each other, and the two transformer winding channels penetrate through the first transformer winding channel side and the second transformer winding channel side; the inductance middle column is arranged between the two inductance side columns, and a channel between each inductance side column and the inductance middle column is an inductance winding channel. The inductance magnetic core further comprises a first inductance winding channel side and a second inductance winding channel side which are opposite to each other, the two inductance winding channel sides penetrate through the first inductance winding channel side and the second inductance winding channel side, and the second transformer winding channel side is adjacent to the first inductor winding channel side.

Preferably, wherein a second end of the first winding and a second end of the second winding are electrically connected to an output positive terminal, and the output positive terminal is disposed adjacent to the second transformer winding channel side and the first inductance winding channel side.

Preferably, wherein after the first winding is wound twice the transformer middle column in the first direction, the first winding passes through the second transformer winding channel side along the outer side of one transformer side column, and then is wound twice the inductance middle column in the second direction; and the second winding is wound twice the transformer middle column and the inductance middle column in the second direction.

Preferably, wherein a second end of the first winding and a second end of the second winding are electrically connected to an output positive terminal, and the output positive terminal is arranged adjacent to the side of the first transformer winding channel.

Preferably, wherein the first winding first passes through the second transformer winding channel and then is wound twice the inductance middle column in the second direction, and then a round and half is wound around the transformer middle column in the first direction; and the second winding is wound twice the transformer middle column and the inductance middle column in the second direction.

DESCRIPTION OF THE EMBODIMENTS

Figure 1:
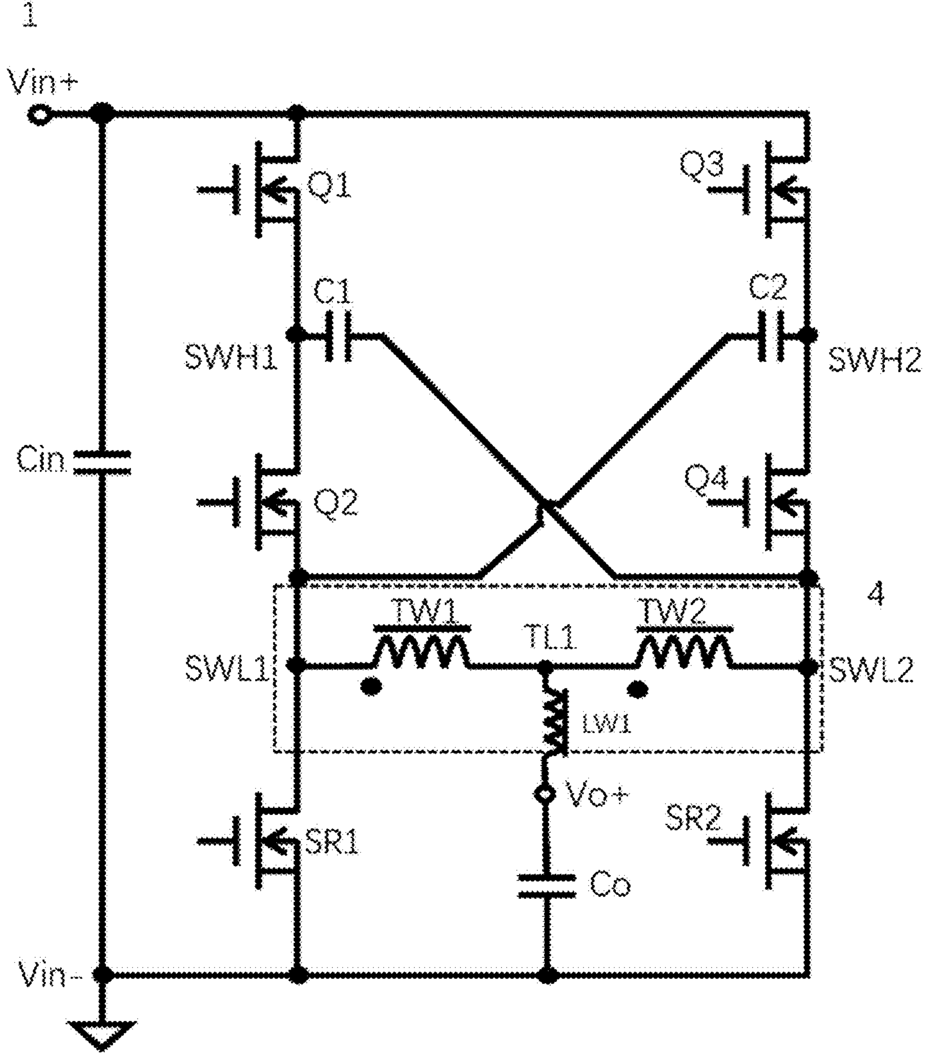
FIG. 1 is a schematic diagram of a topology of a power conversion circuit.

The present application discloses various embodiments or examples of implementing the thematic technological schemes mentioned. To simplify the disclosure, specific instances of each element and arrangement are described below. However, these are merely examples and do not limit the scope of protection of this application. For instance, a first feature recorded subsequently in the specification formed above or on top of a second feature may include an embodiment where the first and second features are formed through direct contact, or it may include an embodiment where additional features are formed between the first and second features, allowing the first and second features not to be directly connected. Additionally, these disclosures may repeat reference numerals and/or letters in different examples. This repetition is for brevity and clarity and does not imply a relationship between the discussed embodiments and/or structures. Furthermore, when a first element is described as being connected or combined with a second element, this includes embodiments where the first and second elements are directly connected or combined with each other, as well as embodiments where one or more intervening elements are introduced to indirectly connect or combine the first and second elements.

Embodiment 1

The power conversion circuit disclosed by the embodiment is as shown in FIG. 1, the power conversion circuit comprises an input terminal Vin, an output terminal Vo, at least one input capacitor Cin, at least one output capacitor Co and a circuit unit. The input end Vin comprises an input positive terminal Vin+ and an input negative terminal Vin−, and the output terminal Vo comprises an output positive terminal Vo+ and an output negative terminal Vo−. In the embodiment, the input negative terminal and the output negative terminal are short-circuited. The input terminal of the circuit unit and the input capacitor Cin are connected in parallel between the input positive terminal Vin+ and the input negative terminal Vin−. The output terminal of the circuit unit and the output capacitor Co are connected in parallel between the output positive terminal Vo+ and the output negative terminal Vo−. The circuit unit comprises six switches, a transformer, an inductor and two flying capacitors. The six switches are upper switches Q1 and Q3, middle switches Q2 and Q4 and lower switches SR1 and SR2 respectively. The two flying capacitors are capacitors C1 and C2. The transformer comprises a winding assembly 81, and the winding assembly 81 comprises two transformer windings TW1 and TW2. The inductor comprises an equivalent inductance winding LW1. The upper switch Q1, the middle switch Q2 and the lower switch SR1 are sequentially connected in series to form a three-switch bridge arm, and the upper switch Q3, the middle switch Q4 and the lower switch SR2 are sequentially connected in series to form another three-switch bridge arm. The upper switch Q1 and the middle switch Q2 are electrically connected to the upper node SWH1, the middle switch Q2 and the lower switch SR1 are electrically connected to the lower node SWL1, the drain electrode of the upper switch Q1 is electrically connected with the input positive terminal Vin+, and the source electrode of the lower switch SR1 is electrically connected with the input negative terminal Vin−. The upper switch Q3 and the middle switch Q4 are electrically connected to the upper node SWH2, the middle switch Q4 and the lower switch SR2 are electrically connected to the lower node SWL2, the drain electrode of the upper switch Q3 is electrically connected with the input positive terminal Vin+, and the source electrode of the lower switch SR2 is electrically connected with the input negative terminal Vin−. The second end of the transformer winding TW1 and the second end of the TW2 are electrically connected to the winding connecting point TL1, the first end of the transformer winding TW1 is electrically connected to the lower node SWL1, and the first end of the transformer winding TW2 is electrically connected to the lower node SWL2. The first end of the transformer winding TW1 and the second end of the transformer winding TW2 are dotted terminals (ie, the polarity of the two terminals are same) and are marked as point ends. The first end of the inductor LW1 is electrically connected to the winding connection point TL1, the second end of the inductor LW1 is electrically connected to the output positive terminal Vo+, and the output capacitor Co is bridged between the output positive terminal Vo+ and the output negative terminal Vo− (ie, the input positive terminal Vin−).

In another embodiment, some of the switching devices in the power conversion circuit may be used in parallel with two or more switching devices to reduce the current stress or thermal stress of each switching device. In the power conversion circuit shown in FIG. 2A, the middle switch Q2 comprises two switching devices Q2*a* and Q2*b* which are connected in parallel, the middle switch Q4 comprises two switching devices Q4*a* and Q4*b* which are connected in parallel, the lower switch SR1 comprises two switching devices SR1*a* and SR1*b* which are connected in parallel, and the lower switch SR2 comprises two switching devices SR2*a* and SR2*b* which are connected in parallel.

Figure 2A:
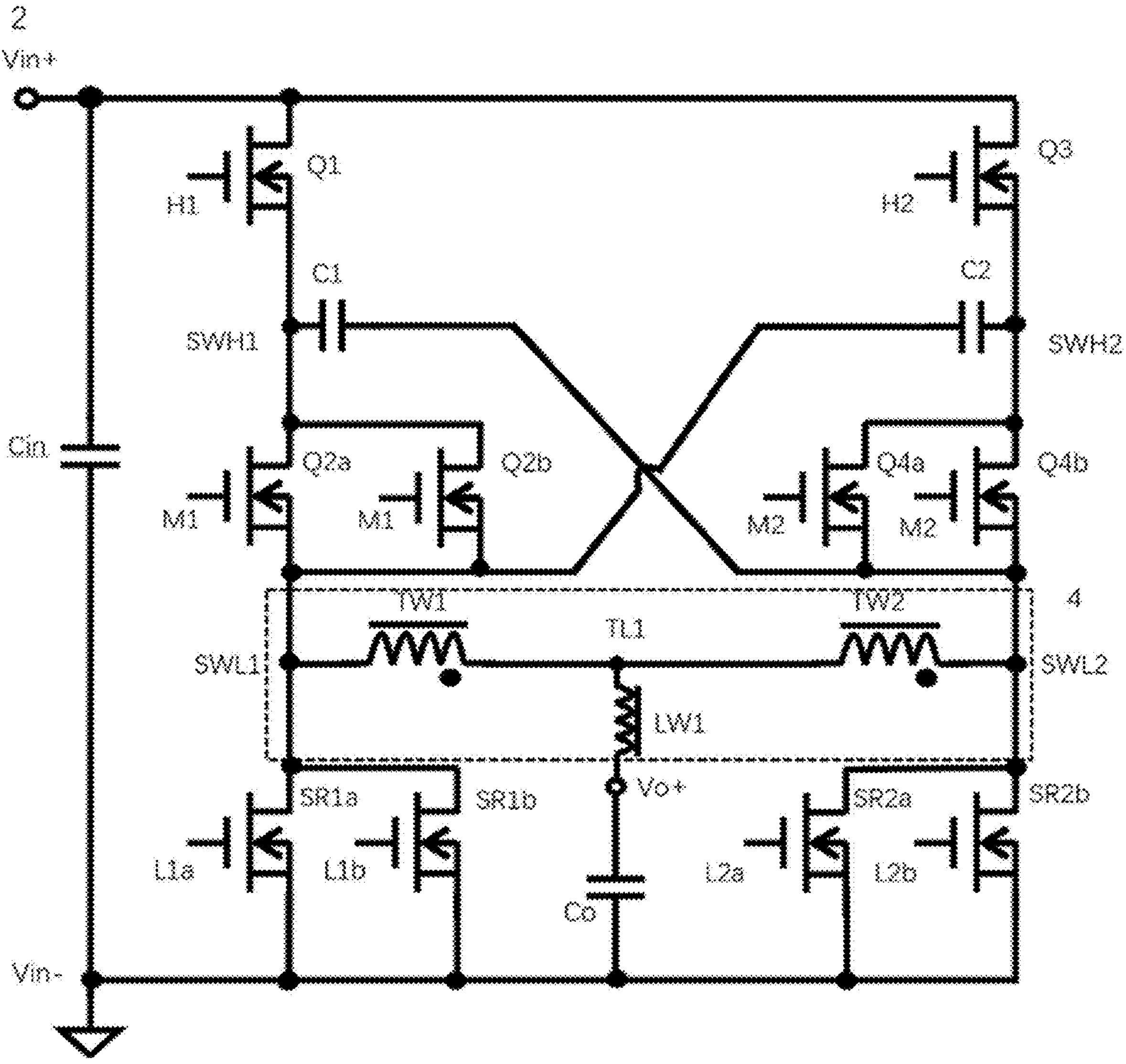
FIG. 2A is a schematic diagram of another power conversion circuit topology.
Figure 2B:
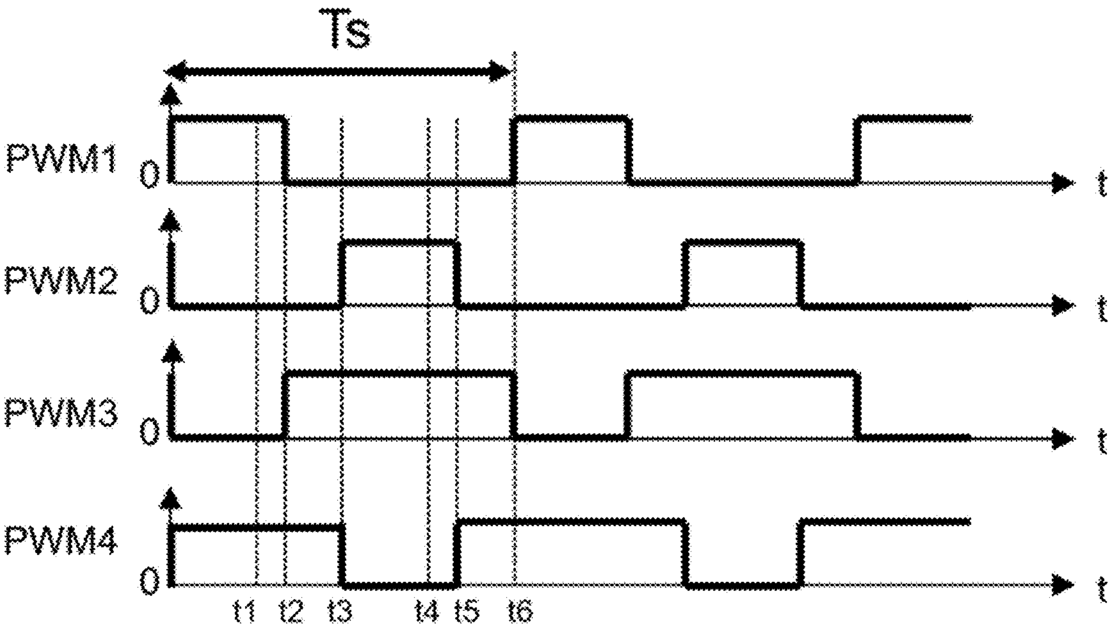
FIG. 2B to FIG. 2C are schematic diagrams of a control strategy.
Figure 2C:
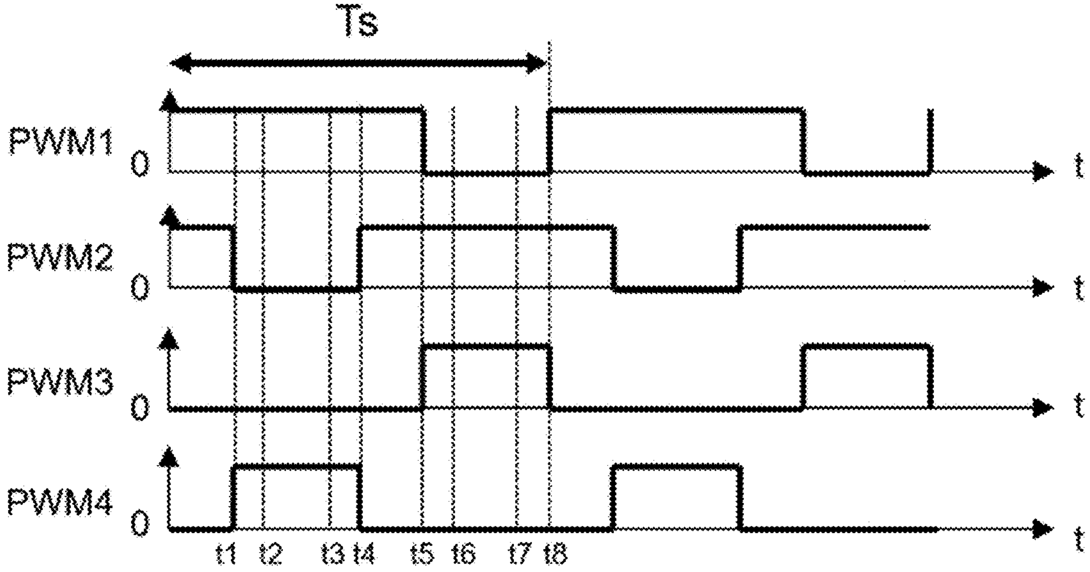

A control signal used by the power conversion circuit is shown in FIG. 2B and FIG. 2C. FIG. 2B shows a schematic diagram of a control signal group with a duty ratio D≤50%, and FIG. 2C shows a schematic diagram of a control signal group having a duty cycle D>50%. As shown in FIG. 2B, the control signal group comprises a first control signal PWM1, a second control signal PWM2, a third control signal PWM3 and a fourth control signal PWM4. The first control signal PWM1 and the second control signal PWM2 are staggered by 180 degrees, the third control signal PWM3 is complementary to the first control signal PWM1, and the fourth control signal PWM4 is complementary to the second control signal PWM2.

When the duty ratio D of the control signal of the power conversion circuit is less than or equal to 50% (the duty ratio of the first control signal of the upper switch Q1 and the second control signal for controlling the upper switch Q3 is defined as the duty ratio of the power conversion circuit), the first control signal PWM1 controls the on and off of the upper switch Q1 and the middle switch Q4, and the second control signal PWM2 controls the on and off of the upper switch Q3 and the middle switch Q2, the third control signal PWM3 controls the on and off of the lower switch SR2, and the fourth control signal PWM4 controls the on and off of the lower switch SR1. As shown in FIG. 2B, the interval from the time 0 to the time t6 is one switching period Ts of the power conversion circuit.

When the duty ratio of the control signal of the power conversion circuit is greater than 50%, the first control signal PWM1 controls the on and off of the upper switch Q1, and the second control signal PWM2 controls the on and off of the upper switch Q3, the third control signal PWM3 controls the on and off of the middle switch Q2 and the lower switch SR2, and the fourth control signal PWM4 controls the on and off of the middle switch Q4 and the lower switch SR1.

In the embodiment, when the duty ratio D of the upper switch is less than or equal to 50%, the middle switches Q2 and Q4 are switched on and off as the corresponding upper switches respectively at the same time; that is, the middle switch Q2 and the upper switch Q3 are switched on and off at the same time; and the middle switch Q4 and the upper switch Q1 are switched on and off at the same time. Under this condition, the output voltage expression is Vo=Vin*D/2, wherein D is the duty ratio of the upper switch. When the duty ratio of the upper switch is greater than 50%, the middle switches Q2 and Q4 are switched on and off as the corresponding lower switches respectively at the same time; that is, the middle switch Q2 and the lower switch SR2 are switched on and off at the same time; and the middle switch Q4 and the lower switch SR1 are switched on and off at the same time. Under this condition, the output voltage expression is also Vo=Vin*D/2, wherein D is the duty ratio of the upper switch. According to the control mode, the output voltage is proportional to the duty ratio of the upper switch, so that when the input voltage is smaller than 48V, the duty ratio of the upper pipe can be greater than 50%, and the output voltage can continue to maintain 12V.

Figure 2D:
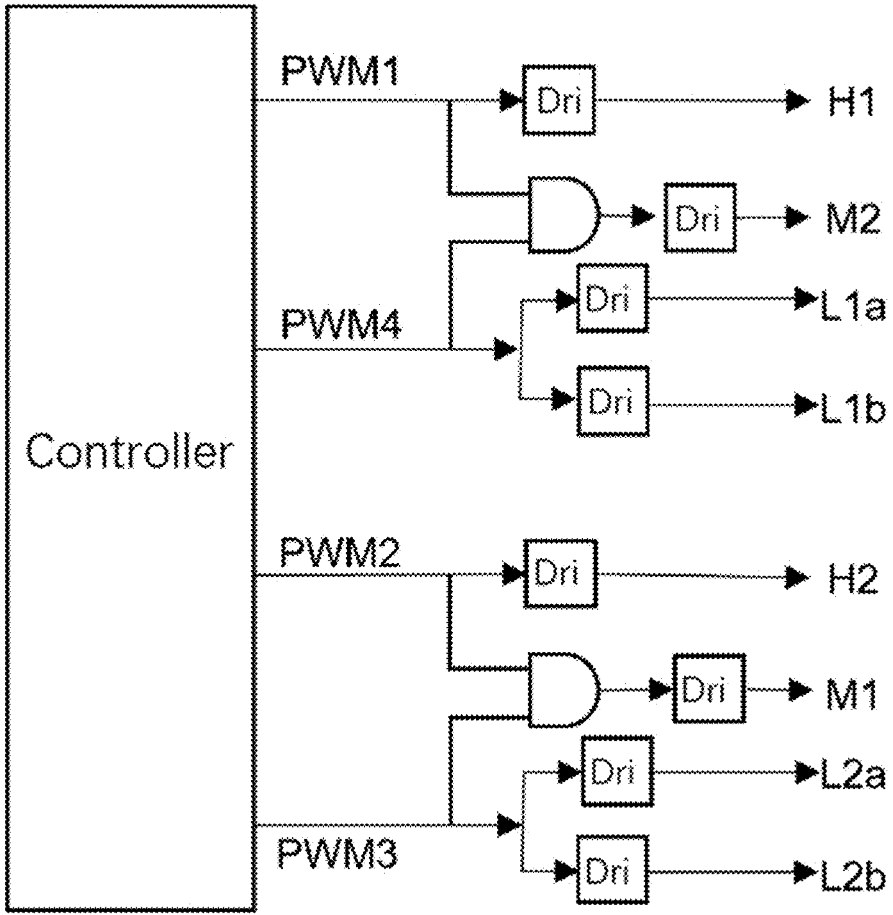
FIG. 2D is a schematic diagram of a driving signal.

In the embodiment, the corresponding relation between the control signal and the driving signal is shown in FIG. 2D. The driving signal H1 of the upper switch Q1 is generated according to the control signal PWM1, and the driving signal H2 of the upper switch Q3 is generated according to the control signal PWM2. The driving signal M1 of the middle switch Q2*a*/Q2*b* is an AND operation result signal of the control signal PWM2 and the control signal PWM3, and the driving signal M2 of the middle switch Q4*a*/Q4*b* is an AND operation result of the control signal PWM1 and the control signal PWM4, so that when the duty ratio is in the range from 0 to 1, the control signal of the middle switch Q2 can be autonomously switched between PWM2 and PWM3, and the control signal of the middle switch Q4 can also be autonomously switched between PWM1 and PWM4. The driving signal L1*a* of the lower switch SR1*a* and the driving signal L1*b* for driving the lower switch SR1*b* are generated by the control signal PWM4 through the two drivers respectively, and the driving signal L2*a* of the lower switch SR2*a* and the driving signal L2*b* for driving the lower switch SR2*b* are generated by the control signal PWM3 through the two drivers respectively. The two switches connected in parallel adopt the same control signal to be driven by the two drivers respectively, so that the turn-on and turn-off speed of the switch can be greatly improved, and the switching loss caused by the Miller effect (Miller) of the switch is effectively reduced.

Figure 3A:
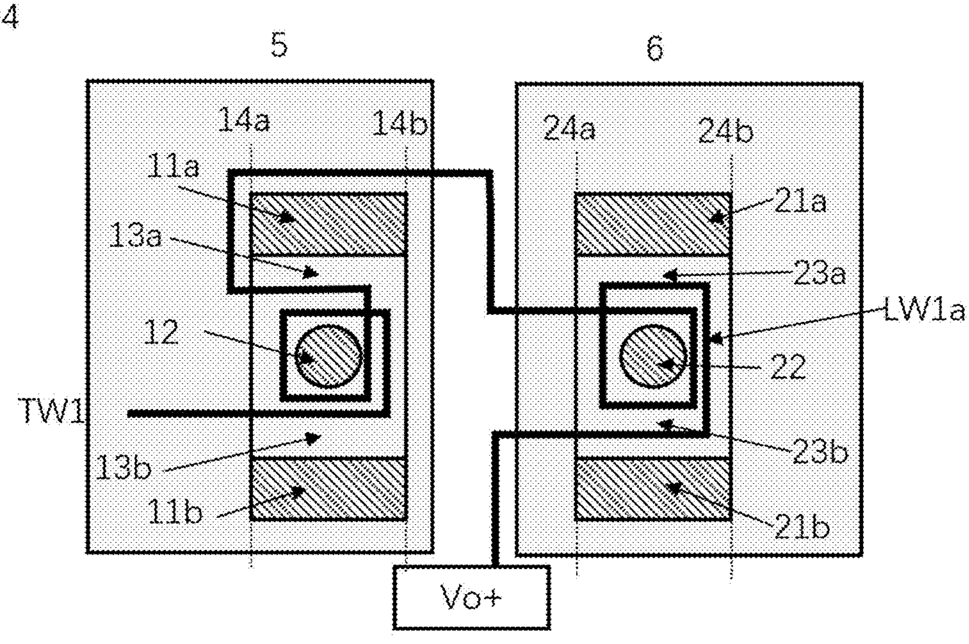
FIG. 3A to FIG. 3C are schematic diagrams of a magnetic assembly structure and a winding method.
Figure 3B:
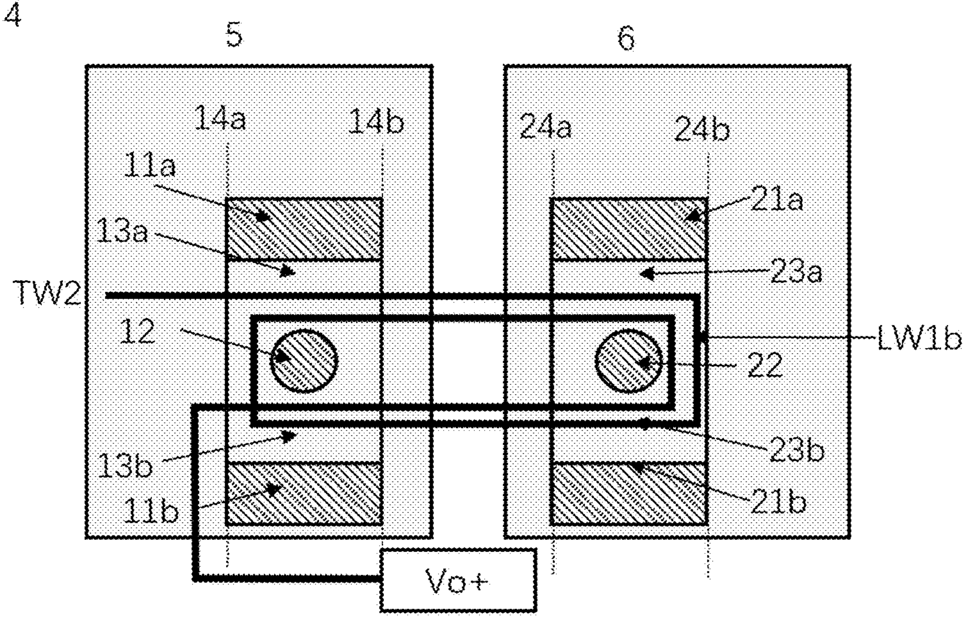

The power conversion device using the power conversion circuit shown in FIG. 1 or FIG. 2A comprises a magnetic assembly 4, wherein the magnetic assembly 4 comprises a transformer magnetic core 5, an inductance magnetic core 6, a first winding and a second winding (the first winding and the second winding respectively comprise a transformer winding connected in series to an inductance winding), as shown in FIG. 3A and FIG. 3B.

The transformer 5 comprises two transformer magnetic substrates (not shown), two transformer side columns 11*a* and 11*b* and a transformer middle column 12, wherein the two transformer side columns 11*a* and 11*b* and one transformer middle column 12 are arranged between the two transformer magnetic substrates and are sequentially arranged according to the sequence of the side column, the middle column and the side column. A channel between the transformer middle column 12 and the transformer side column 11*a* is a transformer winding channel 13*a*, and a channel between the transformer middle column 12 and the transformer side column 11*b* is a transformer winding channel 13*b*. The magnetic core 10 further comprises two opposite sides, namely a first transformer winding channel side 14*a* and a second transformer winding channel side 14*b*, and the transformer winding channel 13*a* and the transformer winding channel 13*b* both penetrate through the first transformer winding channel side 14*a* and the second transformer winding channel side 14*b*.

The inductance magnetic core 6 comprises two inductance magnetic substrates (not shown), two inductance side columns 21*a* and 21*b* and an inductance middle column 22, wherein the two inductance side columns 21*a* and 21*b* and one inductance middle column 22 are arranged between the two inductance magnetic substrates and are sequentially arranged according to the sequence of the side column, the middle column and the side column. The channel between the inductance middle column 22 and the inductance side column 21*a* is an inductance winding channel 23*a*, and the channel between the inductance middle column 22 and the inductance side column 21*b* is an inductance winding channel 23*b*. the inductance magnetic core 20 further comprises two opposite sides which are a first inductance winding channel side 24*a* and a second inductance winding channel side 24*b* respectively. The inductance winding channel 23*a* and 23*b* both penetrate through the first inductance winding channel side 24*a* and the second inductance winding channel side 24*b*.

The transformer magnetic core 5 and the inductance magnetic core 6 are arranged side by side, so that the second transformer winding channel side 14*b* is adjacent to the first inductance winding channel side 24*a*, and the transformer winding channel 13*a* or the transformer winding channel 13*b* is approximately parallel to the inductance winding channel 23*a* or the inductance winding channel 23*b*. When the first transformer winding channel side 14*a* is defined as the left side of the magnetic assembly 4 and the second inductance winding channel side 24*b* is the right side of the magnetic assembly 4, the upper side and the lower side of the magnetic assembly 4 are located between the left side and the right side of the magnetic assembly 4.

In this embodiment, the equivalent inductance winding LW1 is divided into LW1*a* and LW1*b*. The first winding comprises a transformer winding TW1 and an equivalent inductance winding LW1*a*. The second winding comprises a transformer winding TW2 and an equivalent inductance winding LW1*b*. In the embodiment, the first end of the first winding (ie, the first end of the transformer winding TW1) and the first end of the second winding (ie, the first end of the transformer winding TW2) are both arranged on the first transformer winding channel side 14*a*, and the second end of the first winding (ie, the second end of the equivalent inductance winding LW1*a*) and the second end of the second winding (ie, the second end of the equivalent inductance winding LW1*b*) are both arranged on the lower side of the magnetic assembly 4.

In detail, as shown in FIG. 3A, the transformer winding TW1 is wound twice the middle column 12 in a counter-clockwise direction (defined as a first direction) from the first end to the second end; the second end of the transformer winding TW1 is wound around the side column 11*a* from the first transformer winding channel side 14*a* and along the outer side of the transformer magnetic core 10, and then passes through the second transformer winding channel side 14*b*, and is electrically connected with the equivalent inductance winding LW1*a*. And then the equivalent inductance winding LW1*a* is wound twice the inductance middle column 22 from the first end to the second end in a clockwise direction (defined as a second direction), and is electrically connected with an output positive terminal Vo+ (equivalent to an output positive pin) of the power conversion circuit after passing through the first inductance winding channel side 24*a*.

As shown in FIG. 3B, the second winding sequentially passes through the transformer winding channel 13*a* (which is part of the winding of the transformer winding TW2), the inductance winding channel 23*a* (which is part of the winding of the equivalent inductance winding LW1*b*), the inductance winding channel 23*b* (which is part of the winding of the equivalent inductance winding LW1*b*) and the transformer winding channel 13*b* (which is part of the winding of the transformer winding TW2) from the first end to the second end, that is, wounding around the winding of the transformer middle column 12 and the inductance middle column 22. In the embodiment, after the transformer winding TW2 and the equivalent inductance winding LW1*b* are wound twice the transformer middle column 12 and the inductance middle column 22, the transformer winding TW2 is electrically connected with the equivalent inductance winding LW1*b*, and then the equivalent inductance winding is electrically connected with an output positive terminal Vo+ (equivalent to an output positive pin) of the power conversion circuit.

As shown in FIG. 3A and FIG. 3B, the equivalent inductance winding is divided into LW1*a* and LW1*b*, and the two parts are connected in series with the transformer windings TW1 and TW2 respectively, so that a first winding and a second winding are formed, which brings the advantages that a second winding path formed by series connection of the transformer winding TW2 and the equivalent inductance winding LW1*b* is the shortest, the parasitic resistance of the winding is reduced, and therefore the conduction loss of the winding is reduced. Secondly, the first winding and the second winding are respectively connected to the output positive pin of the power conversion circuit from the left side and the right side of the transformer magnetic core 5, so that the parasitic resistance flowing to path of the output positive pin of the power conversion circuit is greatly reduced, and the loss is further reduced. Thirdly, the first end of each transformer winding is located on the same side of the transformer, and the output positive pin of the power conversion circuit is located on the second side adjacent to the first side of the transformer.

Figure 3C:
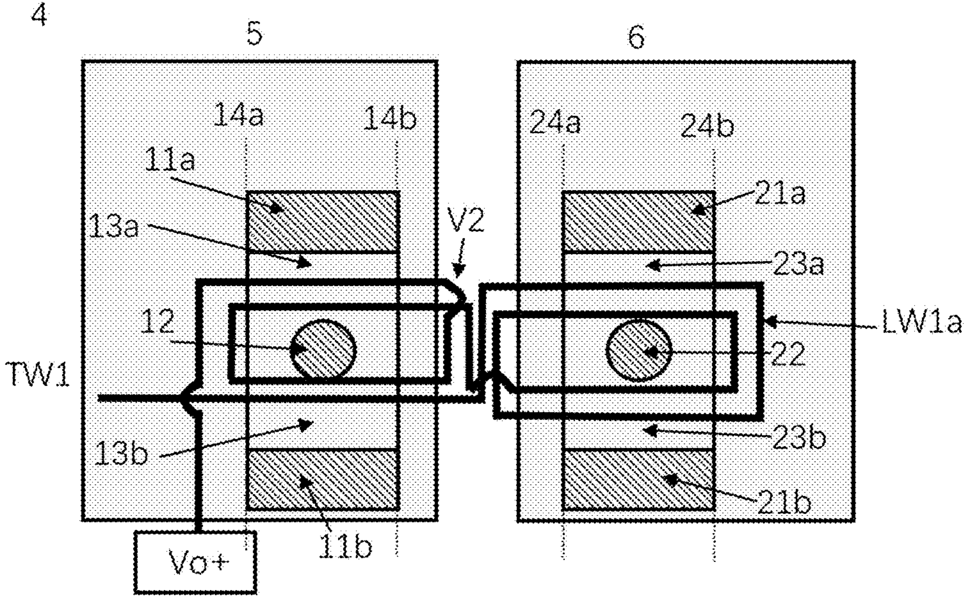

In another embodiment, as shown in FIG. 3C, the first winding from the first end to the second end sequentially passes through the transformer winding channel 13*b* (which is part of the winding of the transformer winding TW1), and then sequentially passes through the inductance winding channel 23*a* and the inductance winding channel 23*b* (which is part of the winding of the equivalent inductance winding LW1*a*), and is wound twice the inductance middle column 22 in the clockwise direction, then passed through the transformer winding channel 13*a*, the transformer winding channel 13*b* and the transformer winding channel 13*a* again, and are electrically connected with the output positive terminal Vo+ (ie, the output positive pin) of the power conversion circuit adjacent to the first transformer winding channel side 14*a*. Compared with the winding method of the first winding shown in FIG. 3A, the path of the winding method of the first winding shown in FIG. 3C is shortened, the parasitic resistance is reduced, and the loss generated on the winding is lower. Furthermore, the winding method of the first winding disclosed by the embodiment is suitable for the application of the output positive terminal Vo+ located on the left side of the transformer magnetic core. The transformer magnetic core disclosed by the embodiment can be realized by adopting a ferrite material, and the inductance magnetic core can be realized by adopting an iron powder material.

The three magnetic columns in the transformer magnetic core 10 or the inductance magnetic core 20 shown in FIG. 3A to FIG. 3C can be independently formed with the two magnetic substrates, the three magnetic columns and one magnetic substrate can be integrally formed, or the three magnetic columns are divided into two parts, and each part is integrally formed with one magnetic substrate. Furthermore, the three magnetic columns of the transformer and the three magnetic columns of the inductor can share two magnetic substrates, and the transformer magnetic core material and the inductance magnetic core material can adopt ferrite. The cross section of the connection between the magnetic column of the transformer magnetic core 10 or the inductance magnetic core 20 and the magnetic substrate can be rectangular, square, circular or oval, etc., and is not limited thereto. The switch disclosed by the application can be Si MOSFET, SiC MOSFET, GaN MOSFET or IGBT MOSFET, which can be used for realizing the function of the switch disclosed by the application.

Figure 4:
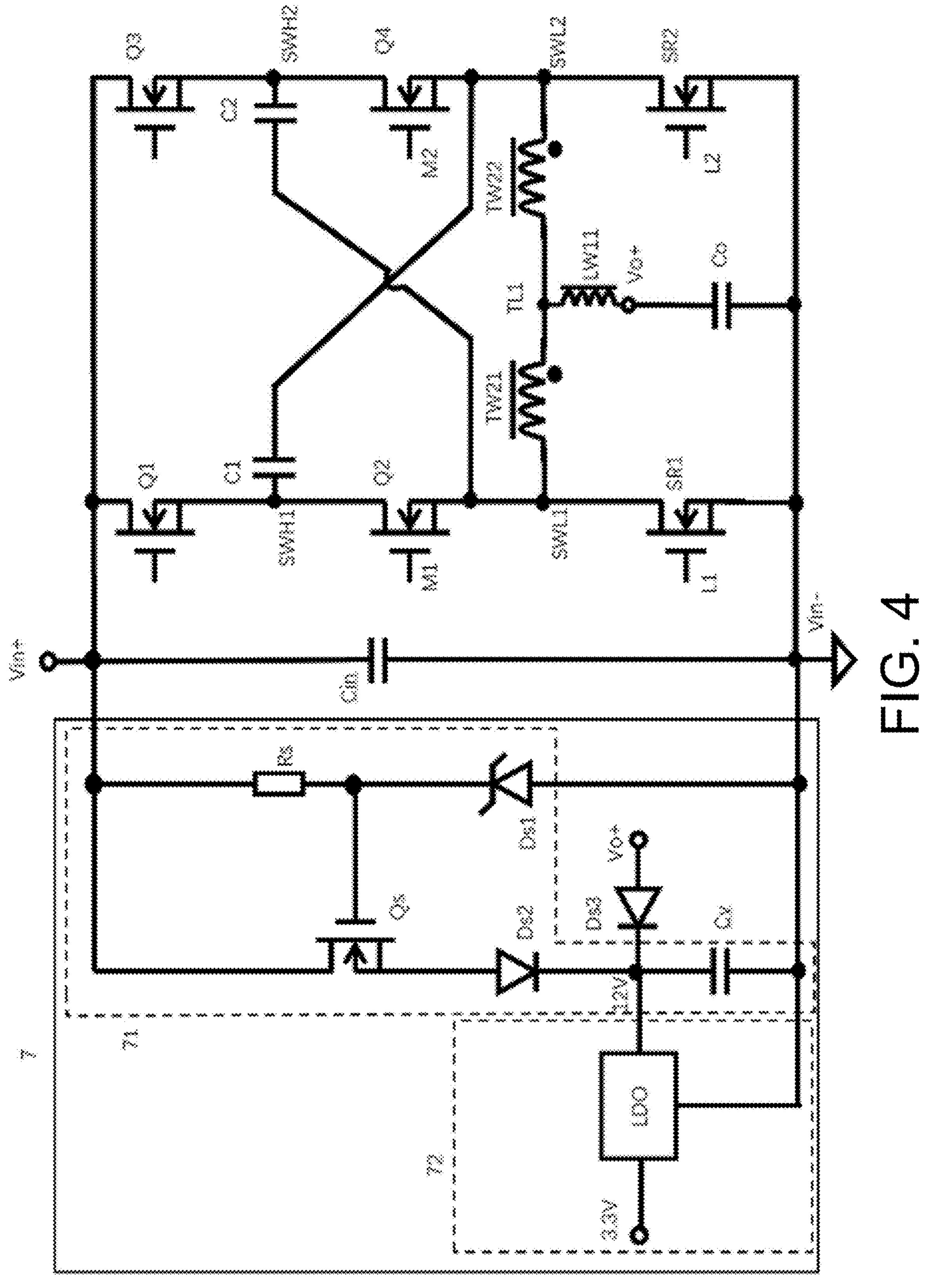
FIG. 4 is a schematic diagram of a power conversion circuit and an auxiliary power supply unit.

The power conversion device disclosed by the application further comprises an auxiliary power supply circuit 7. As shown in FIG. 4, the auxiliary power supply circuit 7 comprises a linear voltage stabilizing circuit 71, an LDO voltage stabilizing circuit 72 and a diode Ds3. The linear voltage stabilizing circuit 71 comprises a regulated diode Ds1, a linear switch Qs, a resistor Rs, a diode Ds2 and a capacitor Cv; the resistor Rs and the diode Ds1 are connected in series between the input positive terminal Vin+ and the input negative terminal Vin−; the negative electrode of the regulated diode Ds1 is electrically connected with the resistor Rs; the positive electrode of the regulated diode Ds1 is electrically connected with the input negative terminal Vin−; the linear switch Qs and the diode Ds2 are electrically connected in series between the input positive terminal Vin+ and the VLDO terminal the gate electrode of the linear switch QS is electrically connected with the negative electrode of the regulated diode Ds1, the drain electrode of the linear switch QS is electrically connected with the input positive terminal Vin+, the source electrode of the linear switch QS is electrically connected with the positive electrode of the diode DS2, and the negative electrode of the diode DS2 is electrically connected with the VLDO terminal; The capacitor CV is bridged between the VLDO terminal and the input negative terminal Vin−. The LDO voltage stabilizing circuit 72 reduces the voltage of the VLDO terminal to 3.3V and supplies power to the MCU and the power management bus. In the embodiment, the voltage of the VLDO is 12V. The regulated diode Ds3 is bridged between the output positive terminal Vo+ and the VLDO positive terminal of the power conversion device, the positive electrode of the regulated diode Ds3 is connected with the positive terminal Vo+, and the negative electrode of the regulated diode Ds3 is connected with the positive terminal of the VLDO.

According to the auxiliary power supply circuit 7 disclosed by the application, when the output voltage Vo does not reach the steady-state voltage (the duration of the output positive terminal outputting a large current is short) or the power conversion circuit is in a standby state (at the moment, the output positive terminal outputs a small current), the input end Vin supplies power to the microprocessor MCU through the voltage stabilizing circuit 71 and the 12V-3.3V voltage stabilizing circuit 72, so that the MCU can maintain communication with the power management bus. When the output voltage Vo of the power conversion device is at the steady-state voltage, the output voltage Vo can supply power to the LDO voltage stabilizing circuit 72 through the diode Ds3. According to the auxiliary power supply circuit 7, power supply of the power conversion device during standby can be realized by adopting a simple linear power supply of a circuit instead of a complex switching power supply of a circuit, and supply electric energy to the MCU power supply management bus of normal work. After the output voltage of the power conversion device is started, the output voltage of the power conversion device is adopted to supply power to the MCU and the driving circuit, which simplify the circuit, the auxiliary power supply loss is also reduced, and the conversion efficiency of the power conversion device is high.

Figure 5:
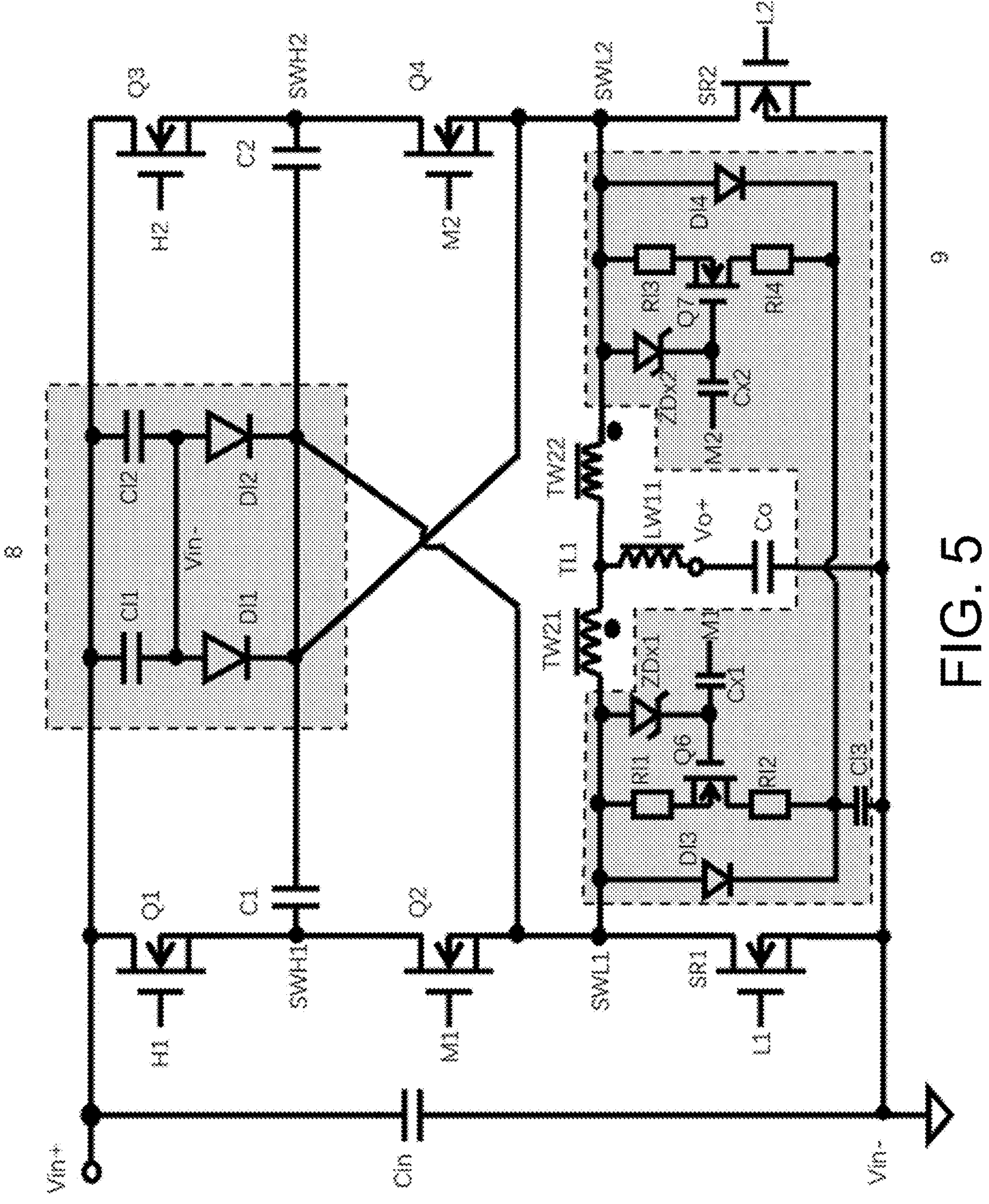
FIG. 5 is a schematic diagram of a power conversion circuit and a clamping circuit.

In the power conversion device disclosed by the application, the power conversion device further comprises a clamping circuit 8 and an active clamping circuit 9, and as shown in FIG. 5, the clamping circuit 8 is used for clamping protection of the voltages between the drain electrode and the source electrode of the upper switches Q1 and Q3, including absorption capacitors C11 and C12 and clamping diodes D11 and D12; The absorption capacitor C11 and the clamping diode D11 are arranged adjacent to the upper switch Q1, and the absorption capacitor C11 is bridged between the input positive terminal Vin+ and the input negative terminal Vin−; the positive electrode of the clamping diode D11 is electrically connected with the input negative terminal Vin−, and the negative electrode of the clamping diode D11 is electrically connected with the lower node SWL2; and the series branch formed by the absorption capacitor C11, the clamping diode D11 and the flying capacitor C1 is connected with the upper switch Q1 in parallel, which is connected at the drain electrode and the source electrode of the upper switch Q1 to form a minimum loop. The absorption capacitor C12 and the clamping diode D12 are arranged adjacent to the upper switch Q3, and the absorption capacitor C12 is bridged between the input positive terminal Vin+ and the input negative terminal Vin−; the clamping diode D12 is electrically connected between the absorption capacitor C12 and the flying capacitor C2 in series, the positive electrode of the clamping diode D12 is electrically connected with the input negative terminal Vin−, and the negative electrode of the clamping diode D12 is electrically connected with the lower node SWL1. A series branch comprised of an absorption capacitor C12, a clamping diode D12 and a flying capacitor C2 is connected with the upper switch Q3 in parallel, which is connected at the drain electrode and the source electrode of the upper switch Q3 to form a minimum loop with the shortest distance. When the upper switch Q1 is turned off, the absorption capacitor C11, the clamping diode D11 and the flying capacitor C1 absorb the voltage spikes generated at the drain electrode to the source electrode; and because the absorption capacitor C11 and the flying capacitor C1 can automatically balance the own charge through the power circuit, the input capacitor C11, the clamping diode D11 and the flying capacitor C1 can continuously absorb voltage spikes generated when the upper switch Q1 is turned off. Similarly, the absorption capacitor C12, the clamping diode D12 and the flying capacitor C2 have similar drain-source voltage clamping protection functions on the upper switch Q3, and details are not described herein again.

The active clamping circuit 9 is used for clamping protection of two ends of the lower switches SR1 and SR2. The active clamping circuit 9 comprises an absorption capacitor C13, clamping diodes D13 and D14, discharge switch Q6 and Q7, discharge resistors R11/R12/R13/R14 and differential capacitors CX1/CX2 and zenar diode ZDx1/ZDx2. In the embodiment, the lower switches SR1 and SR2 share one absorption capacitor C13, and in other embodiments, the lower switches SR1 and SR2 can also comprise two absorption capacitors which are respectively arranged adjacent to one lower switch. The series branch of the clamping diode D13 and the absorption capacitor C13 is connected with the lower switch SR1 in parallel, which is connected at the drain electrode and the source electrode of the lower switch SR1 in the shortest distance, so that the absorption capacitor C13 can effectively absorb the voltage spikes of the drain-source of the lower switch SR1. The positive electrode of the clamping diode D13 is electrically connected with the lower node SWL1, the negative electrode of the clamping diode D13 is electrically connected with one end of the absorption capacitor C13, and the other end of the absorption capacitor C13 is electrically connected with the input negative end Vin−; the source electrode of the discharge switch Q6 is electrically connected with the lower node SWL1 through the discharge resistor R11, the drain electrode of the discharge switch Q6 is electrically connected with the negative electrode of the clamp diode D13 through the discharge resistor R12, and the gate electrode of the discharge switch Q6 and the gate electrode of the middle switch Q2 use the same drive signal or approximately the same drive signal; In the embodiment, the differential capacitor CX1 is connected in series between the gate electrode of the discharge switch Q6 and the gate electrode of the middle switch Q2, and the zenar diode ZDx1 is bridged between the gate electrode of the discharge switch Q6 and the lower node SWL1, so that the differential capacitor CX1 and the zenar diode ZDx1 form a single circuit. The voltage spike of the drain source when the lower switch SR1 is turned off is absorbed by the absorption capacitor C13 through the clamping diode D13. When the middle switch Q2 is conducted, the discharge switch Q6 is conducted at the same time, redundant voltage spike energy absorbed by the absorption capacitor C13 is released to the two ends of the drain-source of the lower switch SR1 through the discharge switch Q6, the discharge resistor R12 and the discharge resistor R11, that is, the energy is transmitted to the output terminal through the transformer instead of being lost, and therefore the conversion efficiency of the power conversion device is improved. When the middle switch Q2 is turned off, the discharge switch Q6 is turned off at the same time, so that the energy storage of the absorption capacitor C13 is effectively prevented from being excessively released, and the voltage at the two ends of C13 is not lower than half of the input voltage Vin of the power conversion circuit. The differential capacitor CX1 and the zenar diode ZDx1 in the circuit can enable the discharge switch Q6 to be turned off earlier than the middle switch Q2. Similarly, the connection mode and the working principle of the lower switch SR2 and the clamp diode D14, the absorption capacitor C13, the discharge switch Q7, the discharge resistors R13 and R14, the differential capacitor CX2 in the gate circuit and the zenar diode ZDx2 can refer to the connection mode and the working principle of the lower switch SR1 and the active clamp circuit thereof, and details are not described herein again.

The power conversion device according to the embodiment can be a part of the electronic device, and can also be an independent power supply module, as long as the technical features and benefits disclosed by the application are met.

The "equal" or "same" or "equal to" disclosed by the invention needs to consider the parameter distribution of engineering, and the error distribution is within +/−30%; and the included angle between the two line segments or the two straight lines is smaller than or equal to 45 degrees; the included angle between the two line segments or the two straight lines is defined as the included angle between the two line segments or the two straight lines in the range of [60, 120]; and the definition of the phase error phase also needs to consider the parameter distribution of the engineering, and the error distribution of the phase error degree is within +/−30%.

What is claimed is:

1. A power conversion device, comprising a power conversion circuit, a group of control signals and a group of drivers;

wherein the power conversion circuit comprises at least two switch bridge arms, each switch bridge arm comprises an upper switch, a middle switch and a lower switch, and the at least two switch bridge arms comprise a first switch bridge arm and a second switch bridge arm;

wherein the group of control signals comprise a first control signal, a second control signal, a third control signal and a fourth control signal, the first control signal and the second control signal are staggered by 180 degrees, the third control signal is complementary to the second control signal, and the fourth control signal is complementary to the first control signal;

wherein the first control signal is used for controlling on and off of the upper switch of the first switch bridge arm, the second control signal is used for controlling on and off of the upper switch of the second switch bridge arm, the third control signal is used for controlling on and off of the lower switch of the second switch bridge arm, and the fourth control signal is used for controlling on and off of the lower switch of the first switch bridge arm;

wherein an AND operation result signal of the first control signal and the fourth control signal are used for controlling the on and off of the middle switch of the second switch bridge arm, and an AND operation result signal of the second control signal and the third control signal is used for controlling the on and off of the middle switch of the first switch bridge arm.

2. The power conversion device of claim 1, wherein a lower switch of each of the switch bridge arms comprises two switches electrically connected in parallel, the third control signal provides drive signals for two lower switches of the second switch bridge arm via two drivers respectively, and the fourth control signal provides drive signals for the two lower switches of the first switch bridge arm respectively via the two drivers.

3. The power conversion device of claim 1, wherein a middle switch of each of the switch bridge arms comprises two switches electrically connected in parallel, two switches of the first switch bridge arm are controlled by a control signal via a driver, and two switches of the second switch bridge arm are controlled by another control signal via a driver.

4. The power conversion device of claim 1, wherein the turn-on duty cycle of the middle switches is the duty cycle of the power conversion device.

5. The power conversion device of claim 4, when the duty cycle is less than or equal to 0.5, the middle switch of the first switch bridge arm is controlled by the second control signal, and the middle switch of the second switch bridge arm is controlled by the first control signal.

6. The power conversion device of claim 4, when the duty cycle is greater than 0.5, the middle switch of the first switch bridge arm is controlled by the third control signal, and the middle switch of the second switch bridge arm is controlled by the fourth control signal.

7. The power conversion device of claim 1, wherein in the first switch bridge arm, the upper switch and the middle switch are electrically connected in series to a first upper node, and the middle switch and the lower switch are electrically connected in series to a first lower node;

and in the second switch bridge arm, the upper switch and the middle switch are electrically connected in series to a second upper node, and the middle switch and the lower switch are electrically connected in series to a second lower node.

8. The power conversion device of claim 7, further comprising two transformer windings; wherein the two transformer windings are coupled; wherein first ends of the two transformer windings are electrically connected to the first lower node and the second lower node respectively, and second ends of the two transformer windings are connected.

9. The power conversion device of claim 8, further comprising two flying capacitors, each of the flying capacitors being connected between the upper node of one switch bridge arm and the lower node of the other switch bridge arm.

10. The power conversion device of claim 9, further comprising an inductor, wherein one end of the inductor is electrically connected to the second ends of the two transformer windings, and the other end of the inductor is electrically connected to a positive output terminal of the power conversion device.

11. The power conversion device of claim 1, wherein the power conversion device converts an input voltage into an output voltage; wherein a voltage gain ratio of the output voltage to the input voltage is D/2; wherein D is a conduction duty cycle of the middle switch.

* * * * *